(12) United States Patent
Hsu et al.

(10) Patent No.: US 11,900,445 B2
(45) Date of Patent: *Feb. 13, 2024

(54) SYSTEM AND METHOD FOR UNIVERSAL MENU INTEGRATION INTERFACE

(71) Applicant: DoorDash, Inc., San Francisco, CA (US)

(72) Inventors: Shelling Hsu, San Francisco, CA (US); Syed Shayon Saleh, San Francisco, CA (US); Karthika Purushothaman, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,508

(22) Filed: Jun. 23, 2022

(65) Prior Publication Data

US 2023/0351483 A1 Nov. 2, 2023

Related U.S. Application Data

(63) Continuation of application No. 16/730,116, filed on Dec. 30, 2019, now Pat. No. 11,397,981.

(51) Int. Cl.
*G06Q 30/0601* (2023.01)
*G06F 9/54* (2006.01)
(Continued)

(52) U.S. Cl.
CPC ......... *G06Q 30/0641* (2013.01); *G06F 9/547* (2013.01); *G06F 16/9538* (2019.01); *H04L 67/02* (2013.01); *G06F 3/0482* (2013.01)

(58) Field of Classification Search
CPC .... G06F 3/0482; G06F 9/547; G06F 16/9338; H04L 67/02; G06Q 30/0641
See application file for complete search history.

(56) References Cited

U.S. PATENT DOCUMENTS 7,571,426 B2 8/2009 Carroll, Jr.
9,842,099 B2 12/2017 Bedard et al.
(Continued)

OTHER PUBLICATIONS

"Depth-first search," Retrieved from: https://en.wikipedia.org/w/index.php?title=Depth-first_search&oldid=932405810 on Aug. 30, 2021 (version from Dec. 25, 2019). (7 pages) (Year: 2019).
(Continued)

*Primary Examiner* — Eric J. Bycer
(74) *Attorney, Agent, or Firm* — Kwan & Olynick LLP

(57) ABSTRACT

Systems and methods for universal menu integration. A digital key is issued to a vendor to access an interface. An uploaded menu is received from the vendor. The uploaded menu is in a universal format based on pre-determined criteria. The menu may be received from the vendor via HyperText Transfer Protocol (HTTP). The uploaded menu may be submitted in a format different from the universal format and then subsequently translated into the universal format. The uploaded menu is posted for receiving online delivery orders. An online delivery order is received from a user device. Last, the online delivery order is transmitted to the vendor. The interface may be an application programming interface (API) utilizing an API library including post, get, and patch functions, as well as out of stock and item availability fields. The system may be configured to receive menu updates after posting the uploaded menu.

20 Claims, 11 Drawing Sheets

(51) Int. Cl.
  *H04L 67/02* (2022.01)
  *G06F 16/9538* (2019.01)
  *G06F 3/0482* (2013.01)

(56) References Cited

U.S. PATENT DOCUMENTS

| | | | |
|---|---|---|---|
| 10,679,469 | B2 | 6/2020 | Salmen et al. |
| 10,896,398 | B1 | 1/2021 | Freed et al. |
| 2002/0013734 | A1 | 1/2002 | Bueno |
| 2005/0004843 | A1 | 1/2005 | Heflin |
| 2006/0218043 | A1 | 9/2006 | Rosenzweig et al. |
| 2006/0271847 | A1 | 11/2006 | Meunier |
| 2007/0156613 | A1 | 7/2007 | Safoutin |
| 2007/0174831 | A1 | 7/2007 | Lee et al. |
| 2008/0177638 | A1 | 7/2008 | Butler |
| 2008/0222004 | A1 | 9/2008 | Pollock et al. |
| 2010/0057742 | A1 | 3/2010 | Hardy-Mcgee |
| 2010/0114734 | A1 | 5/2010 | Giuli et al. |
| 2011/0072371 | A1 | 3/2011 | Segal et al. |
| 2012/0084629 | A1 | 4/2012 | Patrawala et al. |
| 2013/0132231 | A1 | 5/2013 | Teudt |
| 2014/0019272 | A1 | 1/2014 | Lutnick et al. |
| 2020/0219169 | A1 | 7/2020 | Lahijani |
| 2021/0201386 | A1 | 7/2021 | Hsu et al. |

OTHER PUBLICATIONS

"HTTP PUT vs HTTP PATCH in a REST API," by the JAVA Development Journal, retrieved on Aug. 31, 2021 from https://www.javadevelopmen~ournal.corn/spring/rest/http-put-vs-http-patch-in-a-rest-api, published on Jul. 12, 2018 (6 pages) (Year: 2018).

"PATCH Method for HTTP," Internet Engineering Task Force, Request for Comments: 5789, retrieved from https://www.rfc-editor.org/rfc/pdfrfc/rfc5789.txt.pdf on Aug. 30, 2021 (published Mar. 2010). (10 pages) (Year: 201 0).

"What is a REST API? Examples, Uses, and Challenges," by The Postman Team, retrieved on Aug. 31, 2021 from https://blog.postman.com/rest-api-examples, published on Jul. 9, 2020 (6 pages) (Year: 2020).

U.S. Appl. No. 16/730,116, Examiner Interview Summary dated Mar. 23, 2022, 1 pg.

U.S. Appl. No. 16/730,116, Examiner Interview Summary dated Dec. 16, 2021, 2 pgs.

U.S. Appl. No. 16/730,116, Non-Final Office Action dated Sep. 9, 2021, 21 pgs.

U.S. Appl. No. 16/730,116, Notice of Allowance dated Mar. 23, 2022, 13 pgs.

Open API Menu Flowchart

Open API Order Flowchart

API 1.0
[ Base URL: / ]
/schema.json

Authorize

510 — api/v1/menus  Endpoints for retrieving, updating, and creating menus

512 — GET  /api/v1/menus  Get an array of menus with partial attributes for a given store 514 — POST  /api/v1/menus 516 — PATCH  /api/v1/menus/{id}

520 — api/v1/orders  Endpoints for retrieving and confirming success of orders. GET endpoint is under development 530 — api/v1/stores 540 — Models

| | | |
|---|---|---|
| POST /api/v1/menus 414 | | |
| Parameters 502 | | |
| Name | Description | |
| payload *required (body) | Example Value \| Model<br>```<br>{<br>  "reference": "string",<br>  "store": {<br>    "merchant_supplied_id": "string",<br>    "provider_type": "string"<br>  },<br>  "open_hours": {<br>    }<br>    "day_index": "MON"<br>    "start_time": "13:00",<br>    "end_time": "18:00"<br>  }<br>  {<br>  "special_hours": {<br>    }<br>    "date": "2018-12-24",<br>    "closed": true,<br>```<br>⋮<br>Parameter content type<br>[application/json ˅] — 504 | — 502 |
| User-Agent string *(header)* | Your company identity. Format is [name]/[version]. Like 'Sicom/1.0' | 506 |
| Authorization string *(header)* | The access token. Format is [type] [credentials], like 'bearer $101$gkeikcha3' | 508 |
| Responses | 514  Response content type [application/json ˅] | |
| Code | Description | |
| 200 | Success | |
| 400   516 | Bad Request | |
| 403 | Forbidden | |
| 404 | Not Found | |
| ⋮ | ⋮ | |

*FIG. 5B*

| 902 — Menu | 900 |
| 904 — Subtitle | |

906 — Torta Ahogada Sandwich  X
908 — Smothered in a special Jalisco hot sauce and onions 910 — Salsa Choice  Required
- ○ Green Salsa
- ○ Hot Salsa
- ○ Mild Salsa
- ○ No Salsa
- ○ Roasted Salsa

922 — 10 Wings  X
923 — 10 Boneless Wings

924 — Special Cooking Instructions  Optional
925 — ☐ Extra Well Done

926 — Choose Boneless Wing Flavors (Up to 2):  Required
928 — Atomic  ⊖ [2] ⊕
930 — Cajun  ⊖ [8] ⊕
932 — Garlic Parmesan  ⊖ [0] ⊕

*FIG. 9B*

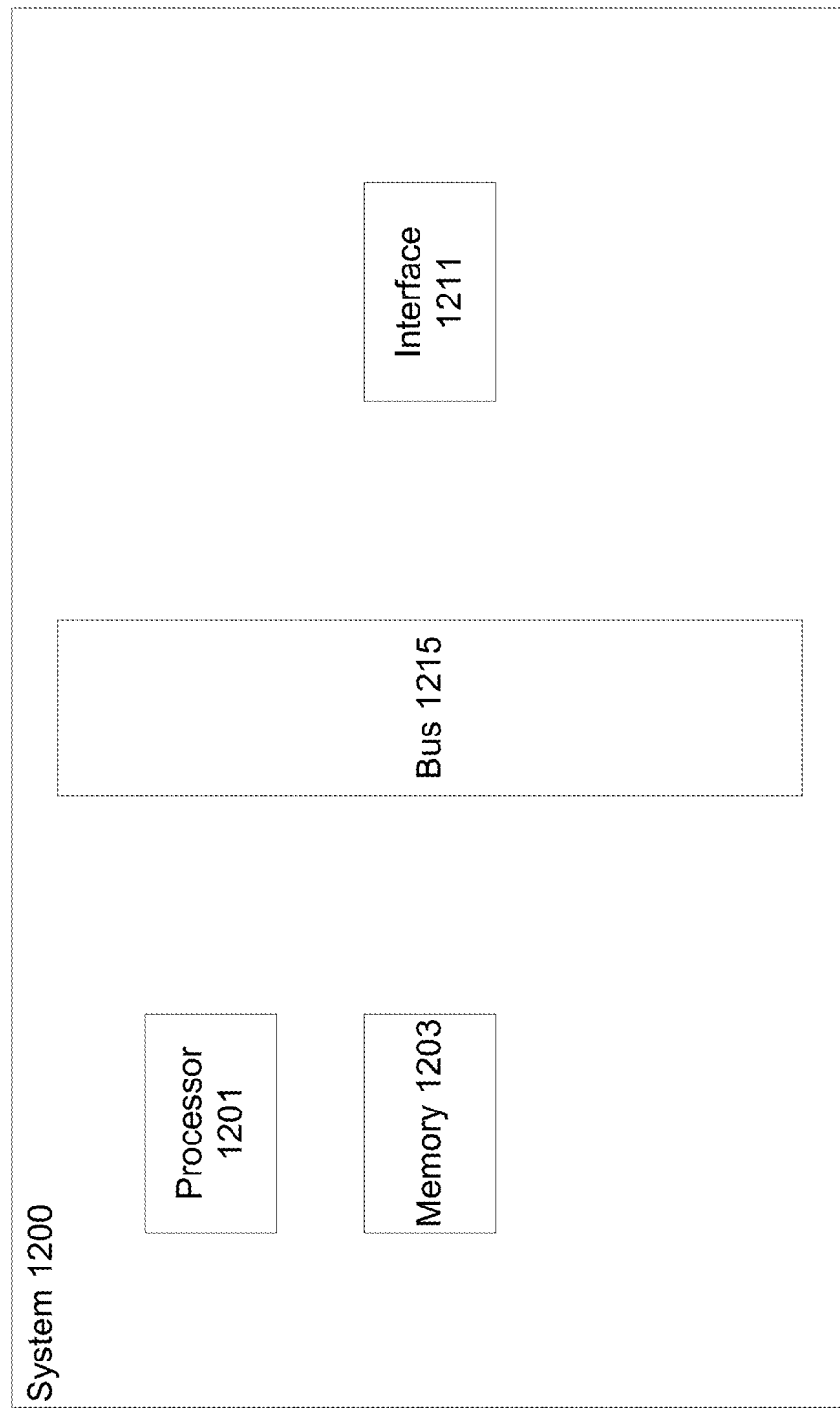

SYSTEM AND METHOD FOR UNIVERSAL MENU INTEGRATION INTERFACE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to computer systems, and specifically to digital menu interfaces.

BACKGROUND

With the advent of on-demand delivery services, food delivery is becoming increasingly prevalent. Traditionally, people ordered food by first calling into a restaurant, ordering food from the delivery menu, and having the order delivered by the restaurant. However, such a service requires the restaurant to hire a delivery person. For many restaurants, hiring delivery people in house may be too costly to implement. Thus, for such restaurants, using a third party delivery service may be a better option. However, since each restaurant has its own unique menu, new restaurant integration into a third party delivery system is a time-consuming process that can take up to several months to complete. In addition, different third party delivery platforms have their own interfaces. Consequently, a single restaurant with multiple third party delivery systems must have a different interface for each different third party delivery service. Thus, there exists a need for a universal menu integration interface that allows multiple restaurants with unique menus to upload their unique menu items to a single universal interface.

SUMMARY

The following presents a simplified summary of the disclosure in order to provide a basic understanding of certain examples of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a method, computer readable medium, and a system for universal menu integration. The system comprises a processor, an interface, and memory. A digital key is issued to a vendor to access an interface. An uploaded menu is received from the vendor. The uploaded menu is in a universal format based on pre-determined criteria. The uploaded menu is posted for receiving online delivery orders. An online delivery order is received from a user device. Last, the online delivery order is transmitted to the vendor.

In some examples, receiving the uploaded menu includes receiving a full menu from the vendor via a HyperText Transfer Protocol (HTTP) request. In some embodiments, each menu item in the uploaded menu includes two different identifiers, a system identifier and a vendor identifier. In some embodiments, the uploaded menu corresponds to a unique reference identifier that is transmitted to the vendor after the uploaded menu is received. In some embodiments, the uploaded menu is submitted in a format different from the universal format and then subsequently translated into the universal format. In some embodiments, the uploaded menu is first uploaded into a task queue before being translated into the universal format. In some embodiments, the uploaded menu is translated into the universal format using a depth first search algorithm. In some embodiments, the interface is an application programming interface (API) utilizing an API library including post, get, and patch functions. In some embodiments, the interface is an application programming interface (API) utilizing an API library including out of stock and item availability fields. In some embodiments, the system is configured to receive menu updates after posting the uploaded menu.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular examples of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIG. 5A shows an example of a graphical user interface (GUI) display corresponding to an application program interface (API), in accordance with examples of the present disclosure.

FIG. 5B shows an example of a GUI display of a post function of an API, in accordance with examples of the present disclosure.

FIG. 9A shows an example GUI display for a menu item, in accordance with examples of the present disclosure.

FIG. 9B an example GUI display for another menu item, in accordance with examples of the present disclosure.

FIG. 12 illustrates a block diagram of an example of a system capable of implementing various processes described herein, in accordance with one or more examples of the present disclosure.

DETAILED DESCRIPTION

Figure 1:
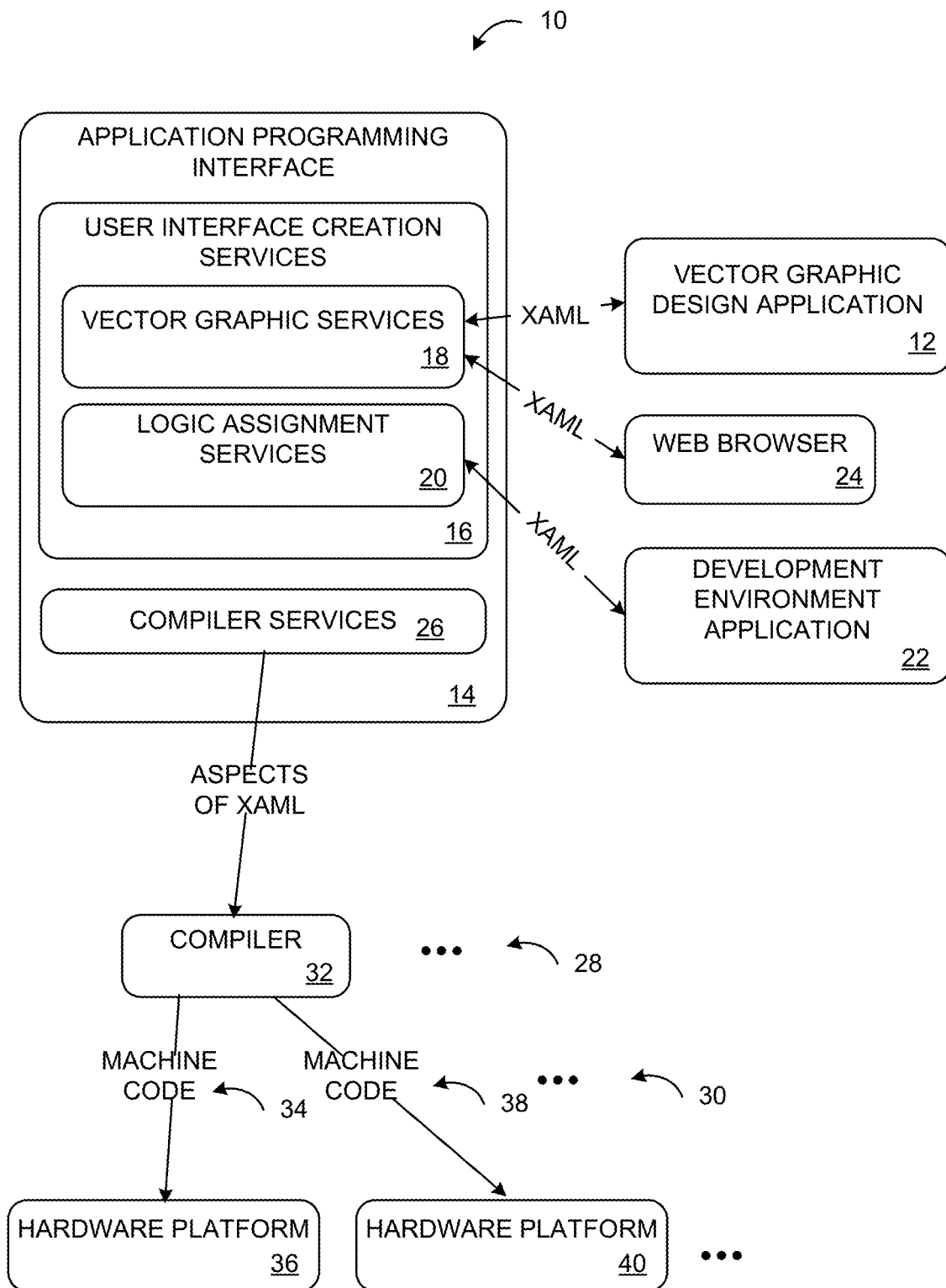
FIG. 1 schematically shows a user interface creation system as disclosed in prior art.

Reference will now be made in detail to some specific examples of the disclosure including the best modes contemplated by the inventors for carrying out the disclosure. Various examples are illustrated in the accompanying drawings. While the disclosure is described in conjunction with these specific examples, it will be understood that it is not intended to limit the disclosure to the described examples. On the contrary, it is intended to cover alternatives, modifications, and equivalents as may be included within the spirit and scope of the disclosure as defined by the appended claims.

For example, the techniques of the present disclosure will be described in the context of restaurant menus and ordering. However, it should be noted that the techniques of the present disclosure apply to a wide variety of network data exchange services, for example, online clothing retail, rideshare services, and social media platforms. In the following description, numerous specific details are set forth in order to provide a thorough understanding of the present disclosure. Particular examples of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some examples include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

A universal menu integration interface may allow multiple vendors or merchants, such as restaurants, with unique menus to upload their unique menu items to a single universal interface. As used herein, the term "universal" is used interchangeably with "open." As used herein, the term "vendor" is used interchangeably with "merchant" to describe users of the described interfaces. A universal interface could be applied to arbitrary situations where inventories need to be synchronized between multiple parties. In addition, the menu structure would allow merchants to apply customization on their products. For each customization option, the structure allows merchants to apply an infinite amount of customizations. In some embodiments, every object in the menu is associated with a merchant supplied_id given by merchants which allows merchants to identify the original object in a merchant's databases, such as on a merchant point of sale (POS) system. The merchant supplied_id will be sent back to the merchant side in orders, such that merchants can reuse their existing APIs since their POS systems will also hit the same APIs with these same identifiers. Thus, the API could behave in an almost identical manner as the existing in-store POS system.

In some embodiments, the menu structure provides some attributes for merchants to configure how the menu will display on the system website of with a desired UI, including a radio checkbox and quantity selector. In addition, the menu structure includes attributes to set business logic, e.g., free quantity, quantity in combination, and conflict objects etc. In some embodiments, menus contain duplicate objects in different places. In such embodiments, to reduce the size of the stored data structures, such as a JSON, merchants can reuse objects already defined in the menu and refer to them in the data structures after the first definition by using "&reference," "*reference," "$reference," and/or "#/pointer."

Figure 2:
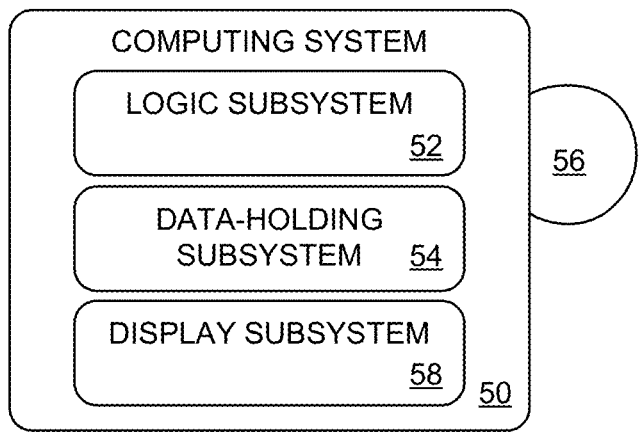
FIG. 2 schematically shows an example computing system as disclosed in prior art.
Figure 3:
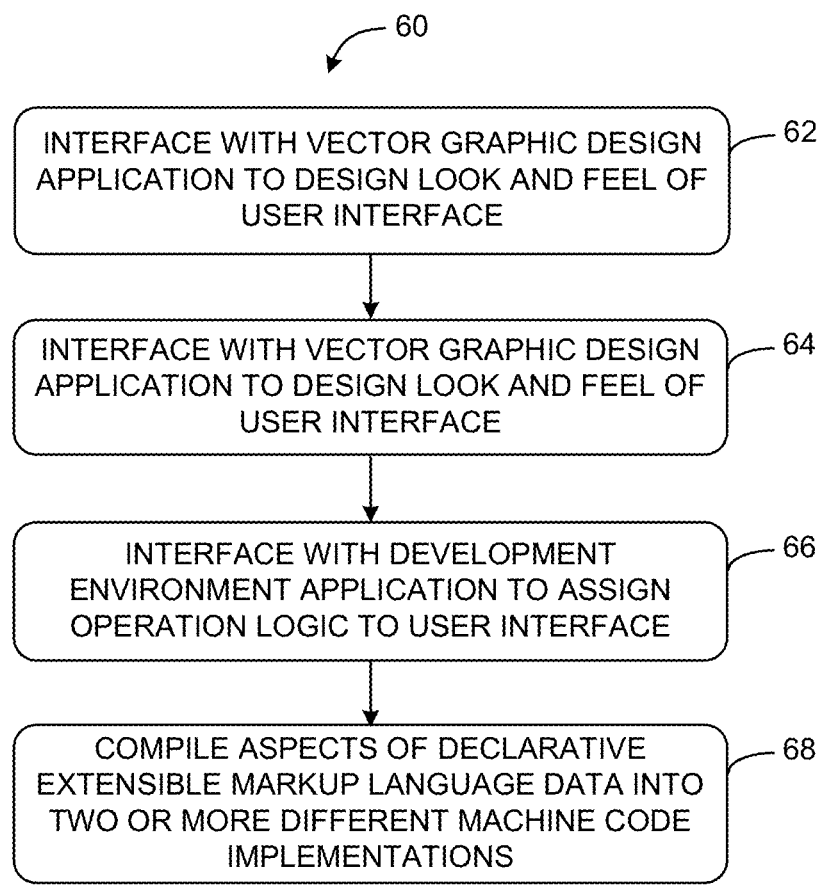
FIG. 3 shows a flow diagram of an example method of user interface creation as disclosed in prior art.

FIGS. 1-3 show example systems and methods for user interface creation, as disclosed in US Patent Application Publication 2011/0072371 to Segal et al., which is incorporated by reference in its entirety. FIG. 1 schematically shows a user interface creation system 10 for creating a user interface. FIG. 2 schematically shows an example computing system 50. FIG. 3 shows a flow diagram of an example method 60 of user interface creation. As described herein, an application programming interface (API) can be utilized for creating user interfaces for a variety of different devices, as well as facilitate communication between applications.

Figure 4A:
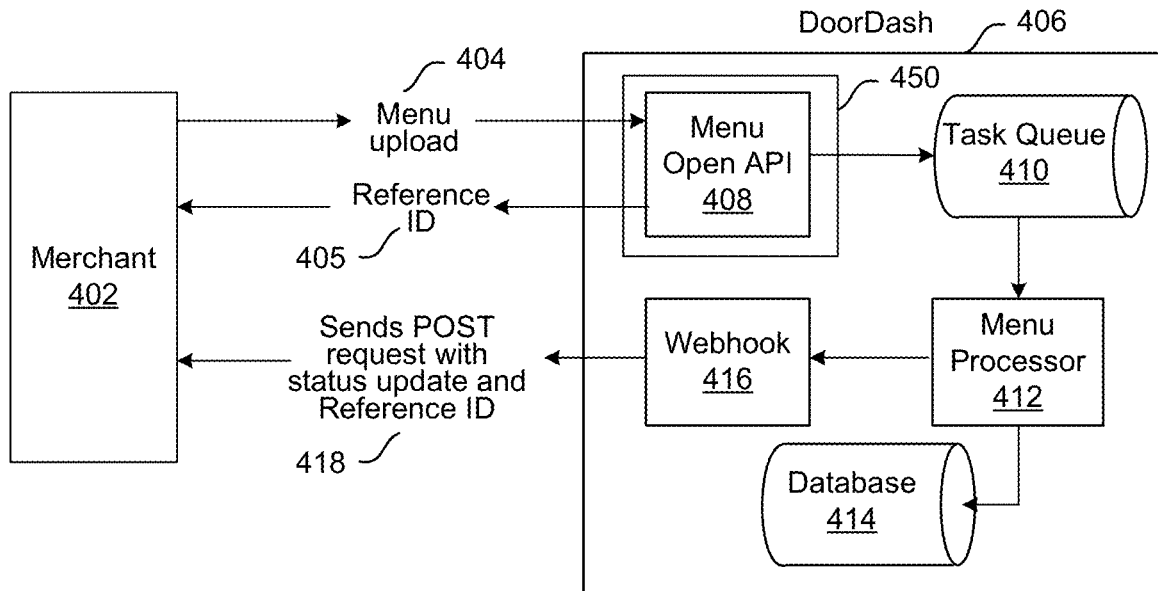
FIG. 4A shows an example of an open API menu flowchart, in accordance with examples of the present disclosure.
Figure 4B:
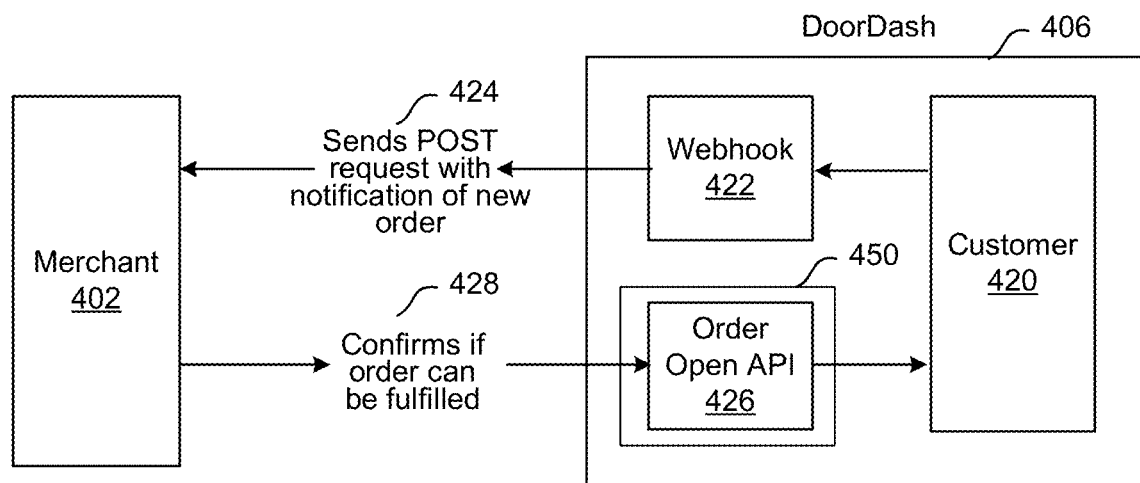
FIG. 4B shows an example of an open API order flowchart, in accordance with examples of the present disclosure.

The described API's may include a merchant API configured to enable users (merchants) to create menus, as well as manage menus and order data. As used herein, a merchant API may be referred to as an open API. FIGS. 4A and 4B show examples of open API flowcharts, in accordance with examples of the present disclosure. FIG. 4A shows an example of an open API menu flowchart for creating and uploading a menu. FIG. 4B shows an example of an open API order flowchart for forwarding orders to the merchant. With reference to FIG. 4A, a third party logistics platform 406 may include open API 450, task queue 410, menu processor 412, database 414, and webhook 416. The open API described herein may be a publicly available application programming interface that provides users with programmatic access to the software application or web service provided by the logistics platform. The open API 450 may be configured with one or more API groups for receiving and transmitting hypertext transfer protocol (HTTP) requests, such as menu open API group 408. Menu open API group 408 may include one or more endpoints for uploading and updating menus on the logistics platform.

A user corresponding to a merchant may communicate with the logistics platform via a merchant interface 402. The user may use merchant interface 402 to upload a menu or convert a menu into a universal format. Using the merchant interface 402, users may be able to create and update menus that are integrated with and displayed on logistics platform 406. In some embodiments, the merchant interface may provide a graphical user interface (GUI) with which users may access the open API and open API groups and input menu parameters via HTTP requests, which will be further described below. Such merchant interface may be accessed by the user on a computing device, such as a point of sale (POS) system. The merchant interface may also be configured with one or more API endpoints for receiving and transmitting HTTP requests. Once the menu has been formatted, the user may transmit a menu upload 404 with menu parameters to a menu creation POST endpoint of menu open API group 408 at the logistics platform. In some embodiments, the menu upload 404 may be transmitted as a POST request.

Once the menu upload is received, the open API may transmit reference identification (ID) 405 corresponding to the particular menu upload. The reference ID 405 may be generated by the logistics platform and transmitted to the user at the open API. Alternatively, the reference ID may be supplied by the user along with the menu upload POST request. The reference ID may serve as a receipt to identify the upload.

In some embodiments, received menu uploads are transferred to task queue 410 where one or more menu uploads may be stored prior to processing. In some embodiments, the task queue may include a database for storing the menu uploads. In some embodiments, the task queue may include a load balancer to route menu uploads to various servers, such as menu processor 412, for processing. For instance, the tasks queue 410 may receive the menu upload 404 and route it to the menu processor 412. Menu processor 412 may read the menu upload and break down entries for insertion into database 414 of the logistics platform. In some embodiments, menu processor 412 implements a depth-first search algorithm to read the menu upload. In some embodiments, menu processor 412 may be configured to read a menu that is uploaded in an original format to parse and identify text in order to automatically input the menu items and options into the described universal format.

Menu processor 412 may then transmit the status of the menu upload to the merchant interface 402. In various embodiments, the status update 418 may be transmitted via webhook 416 as an HTTP POST request. In some embodiments, an endpoint with corresponding uniform resource locator (URL) is created at the merchant interface 402 to receive the webhook notification. For example, upon making a successful request to the POST endpoint of the open API, the user may receive a status update response 418 with a status code indicating that the logistics platform has successfully received the request to create the menu. As another example, once the logistics platform has finished creating the menu, or if the menu creation fails, the logistics platform will send out a POST request via webhook 416 with the menu creation result.

In some embodiments, the load balancer of the task queue may receive the processing status from the menu processor and transmit status update 418 via webhook 416. The status update may notify the user of the status of the menu upload, including successful upload or update of the menu upload, or a failure to upload the menu upload. Other status notifications may include success, bad request, forbidden, not found, unprocessable entity, too many requests, and internal server error. The status update may include the reference ID 405 to identify the menu upload corresponding to the status update. The status update response 418 may include the reference ID to identify the original HTTP request corresponding to the menu upload. The status update response 418 may also include a menu ID identifying the menu that is being processed and uploaded.

In various embodiments, the menu creation pipeline works asynchronously. For example, the open API is an asynchronous API organized around Representational State Transfer (REST) architecture style for designing networked applications. However, other architecture styles may be implemented such as Remote Procedure Calls (RPC).

In some embodiments, users may also retrieve the status of the menu upload by transmitting a GET request via the open API to a menu status GET endpoint of the API group 408. Users may also make changes to successfully uploaded menus. For example, the user's store or restaurant may be closed or shut down for various reasons, affecting the hours of operation. As another example, certain items listed in the menu may become out of stock at some point. The merchant POS system may transmit a menu update message from the merchant interface to a men update PATCH endpoint of the menu open API group 408. For example, the menu update message may be transmitted as a HTTP PATCH request for making partial changes to an existing resource. The logistics platform may then transmit status updates 418 corresponding to the GET or PATCH requests via webhook 416.

Once a menu is successfully processed and integrated within the logistics platform, the menu may be accessible by customers via a network such as the Internet. Customers may access one or more integrated menus using various applications on a client device, such as a personal computer or smartphone. As used herein, client devices used by customers may be referred to as customer devices. For example, a customer may use a web browser to visit a webpage with links to a plurality of menus. The customer may select items and place orders for delivery of such items. With reference to FIG. 4B, logistics platform 406 further comprises customer interface engine 420 which may be configured to provide access to the integrated menus to the customers, such as at a website or within an application. Customer interface engine 420 may further be configured to receive input from the customer device corresponding to ordered items. Open API 450 may further comprise an order open API group 426 with one or more endpoints for managing received orders.

An order notification 424 may then be transmitted to an endpoint configured at the merchant interface 402 via webhook 422 as an HTTP POST request. In some embodiments, webhook 422 may be the same notification engine as webhook 416. In various embodiments, order notification 424 provides a notification of the received order and items included in the order. In some embodiments, webhook 422 may include a translation layer to translate the order notification into a language implemented by the merchant POS system.

The merchant POS system may then determine if the order can be fulfilled by checking inventory or status of the items at the merchant location. The merchant POS system may then transmit an order confirmation 428 to a PATCH endpoint of order open API group 426 as a PATCH request, which indicates whether the order can be fulfilled. The order confirmation 428 may include various status indicators. For example, the order confirmation may include a success status if the order can be fulfilled, and a failure status if one or more items cannot be fulfilled. A failure status may also include reasons for the failure, such as an out-of-stock item. The open API 450 may then forward the order confirmation to the customer device via customer interface engine 420. In some embodiments, the forwarded order confirmation may include other status of the order received from the merchant interface. For example, various events may be periodically transmitted, such as order received, order confirmed, preparation time, preparation status, order completed, etc.

Graphical User Interface

The following FIGS. 5A and 5B illustrate graphical user interface (GUI) displays corresponding to the described open API. Various merchant interfaces may implement such GUIs to allow users to easily access the open API at the logistics platform. FIG. 5A shows an example of a GUI display 500-A corresponding to an application program interface (API), in accordance with examples of the present disclosure. As depicted, GUI 500-A may display one or more selectable categories, including menus 510, orders 520, stores 530, and models 540. Menus 510 may include endpoints for retrieving, updating, and creating menus. Orders 520 may include endpoints for retrieving and confirming success of orders. Stores 530 may include various PUT functions for various notifications related to status of the merchant and corresponding menu items. Models 540 may include a glossary of parameters for various objects of each request.

A user may select menu category 510 in order to access and generate and manage menus for a restaurant. The menu category 510 may include GET functions 512, POST functions 514, and PATCH functions 516. As previously described, GET functions 512 may correspond to an endpoint for retrieving the status of previously uploaded menus. POST functions 514 may include an endpoint for generating or formatting a new menu to upload. PATCH functions 516 may include various endpoints for updating previously uploaded menus.

Creating Menus with the POST Endpoint

FIG. 5B shows an example of a GUI display 500-B of a POST function 514 of an API, in accordance with examples of the present disclosure. In various embodiments, GUI 500-B shows parameters in payload window 502 for various POST functions when POST functions 514 is selected at GUI 500-A. In some embodiments the GUI displays a payload window 502 for inputting parameter values or a model corresponding to the particular menu.

In various embodiments, parameter values may be input in various formats. For example, JAVASCRIPT Object Notation (JSON) may be implemented as a universal format. However, it should be recognized that other formats may be implemented for parameter values, including YAML, PROTOBUF, or PYTHON. The examples provided below will be discussed with reference to JSON format. As depicted in FIG. 5B, the JSON format is selected as parameter content type 504. Provided below is an exemplary menu that may be input into a GUI by a user at a merchant interface. The example menu may be input by a user for a restaurant ABC Cafe.

In some embodiments, the menu model may include parameter values for various objects identifying the restaurant and operating hours associated with the menu. For example, a model may include the following:

```
{
    "reference": "12345-test-id",
    "store":{
        "merchant_supplied_id":"abc12345",
        "provider_type":"abc_cafe"
    },
    "open_hours":[
        {
            "day_index":"MON",
            "start_time":"07:00",
            "end_time":"15:00"
        },
        {
            "day_index":"TUE",
            "start_time":"07:00",
            "end_time":"15:00"
        },
        {
            "day_index":"WED",
            "start_time":"07:00",
```

-continued

```
            "end_time":"15:00"
        },
        {
            "day_index":"THU",
            "start_time":"07:00",
            "end_time":"15:00"
        },
        {
            "day_index":"FRI",
            "start time":"07:00",
            "end time":"15:00"
        }
    ],
    "special_hours":[
        {
            "date":"2018-12-24",
            "closed":"true",
            "start_time":"13:00",
            "end_time":"18:00"
        }
    ],
```

As shown, each menu upload may include a "reference" string, which may identify the particular HTTP request (e.g., menu upload POST request). In some embodiments, the "reference" string may be reference ID 405. In some embodiments, the reference string value is optional. For example, the user may provide the reference ID when uploading the menu. However, the user may leave this parameter empty and the logistics platform may populate this parameter once the menu upload is received. As previously discussed, this "reference" value may be sent back to the user via response to the menu POST request or along with the status update POST request 418.

The model may further include various string values for "merchant supplied_id" for various model objects which may help correspond the particular model objects with objects in the merchant POS system. When transmitted through various HTTP requests, including menu updates or order notifications, the various merchant supplied_id values allow merchants to identify the original object in their POS or database systems. For example, in some embodiments, a client of the logistics platform may be referred to as a provider with one or more merchants at different locations. The merchant supplied_id for the store parameter may allow the merchant POS system to associate the menu with the particular store of the provider where the provider includes multiple locations. The string "abc_cafe" is input for the "provider_type" store parameter, which may further identify the merchant or may indicate how the merchant name will appear on the menu when displayed to the customer. The "provider_type" may be used to indicate the partner an order or menu is associated with. In the JSON body, the provider type and other parameters may be provided in snake case. In the User-Agent header (described below), the Provider Type may be provided in snake case or other formats, such as camel case.

The menu upload then continues with the "open_hours" parameters. These parameters correspond to the merchant's operating hours, and may indicate when the menu will be made available to customers on the logistics platform. For each day that the merchant is open, parameters may be input for "day_index" (day of week), "start_time" (opening time), and "end_time" (closing time). "Special_hours" parameters may also be input to indicate particular days that a store may be closed or open that are not encompassed by the "open_hours parameters." For example, the "special_hours"

parameters of the example model indicates that ABC Cafe's menu will not be available on Dec. 24, 2018.

Additional menu parameters may include menu categories, items, extras, and various options. Examples of such parameters are as follows:

```
"menu"
    "name":"Breakfast",
    "subtitle":"",
    "active":true,
    "categories":[
        {
            "name":"Entree",
            "subtitle":"",
            "merchant_supplied_id":"Entree",
            "active":true,
            "sort_id":0,
```

The menu may include "name" and "subtitle" that would appear when accessed by customers on the logistics platform. For example, the name for the example menu is "Breakfast," which may indicate that this menu includes breakfast items. The model may then list "categories" which may further organize the menu as displayed on the logistics platform. Each category may include string values for "name" and "subtitle." For example, the example menu lists "Entree" for the name of the first category of the Breakfast menu. However, a menu may include multiple other categories, such as appetizers, salads, starters, shared plates, main courses, sandwiches, dessert, sides, items for kids, drinks, etc.

A number of items may then be listed for each category such as:

```
"items":[
    {
        "name":"Burrito Scram-Bowl",
        "description":"Creamy guacamole and fresh pico de gallo top off this hearty Mexican breakfast.",
        "merchant_supplied_id":"26d3fce0-efd2-46d3-832c-ced5bc956401",
        "active":true,
        "price":0,
        "extras":[
        ]
    },
    {
        "name":"Mediterranean Scram-Bowl",
        "description":"Creamy goat cheese, bright and tangy chimichurri with scrambled egg whites.",
        "merchant_supplied_id":"997f345b-1f9c-4d7d-be8a-bddc06a172e2",
        "active":true,
        "price":0,
        "extras":[
        ]
    },
    {
        "name":"Multigrain Oatmeal",
        "description":"A blend of oatmeal, quinoa and flax to fuel your day.",
        "merchant_supplied_id":"d50bee8f-07dc-4e7f-9705-d6439290a140",
        "active":true,
        "price":0,
        "extras":[
        ]
    }
]
},
```

The parameters for items shown under the Entrée category may include a "name," "description," "merchant supplied_id," "active" status, "price," and "extras." The name and description parameters indicate how the menu item will appear and be described to the customer. The "active" status of the item may indicate whether the item is currently available. Such "active" status may be adjusted if stock availability changes, as will be further described below. The "price" parameter will indicate the price of each item.

Other parameters for each menu item may indicate various characteristics of the menu items, and appear as follows:

```
"items": [
    {
        "name": "string",
        "description": "string",
        "merchant_supplied_id": "string",
        "active": true,
        "is_alcohol": true,
        "is_bike_friendly": true,
        "sort_id": 0,
        "price": 0,
        "extras": [
            {
                "name": "string",
                "description": "string",
                "merchant_supplied_id": "string",
                "active": true,
                "sort_id": 0,
                "min_num_options": 0,
                "max_num_options": 0,
                "num_free_options": 0,
                "min_option_choice_quantity": 0,
                "max_option_choice_quantity": 0,
                "min_aggregate_options_quantity": 0,
                "max_aggregate_options_quantity": 0,
                "options": [
                    {
                        "name": "string",
                        "description": "string",
```

-continued

```
"merchant_supplied_id": "string",
"active": true,
```

```
        "price": 0,
        "default": true,
        "sort id": 0,
        "extras": [
            { ...
            }
```

For example, input for "is_alcohol" indicates whether the item includes alcohol, and may affect whether the menu item is displayed to underage customers logged into the logistics platform. Input for "is bike friendly" may indicate whether the item is suitable for transportation via bicycle. If such item is not suitable for bicycle transportation, an order including such item may not be matched with a courier traveling via bicycle.

Additionally, the "extras" parameter may indicate various options for the customer to customize the item. Each "extras" object will include a "name," "description," "merchant_supplied_id," and "active" status parameters. Each extra selection may include one or more "options." Other parameters of the particular "extras" object may include, "_num_options," which indicates how many options are selectable. The max value will not be higher than the count of options that are available for the given "extras" object. For example, a menu is shown in FIG. 9B. In this example, the min_num_options=2, and max_num_options=2 for "Choose Boneless Wing Flavors." This would make the "extras" selection required and forces the customer to make no more than 2 choices.

The "extras" object may further include "_option_choice_quantity" parameters, which indicate the maximum quantity of a single option allowed. If this has a non-null value, a multiple quantity selector may be displayed instead of a checkbox or radio button. For example, the min_option_choice_quantity=2. This means that a customer may select no less than 2 wings per flavor chosen. The "extra's object may further include "_aggregate_choice_quantity" parameters, which may indicate the maximum sum of option quantities allowed. In the example, the min_aggregate_choice_quantity=10 and max_aggregate_choice_quantity=10. This forces the customer to select 10 total wings across their choice of flavors.

Another category for the example "Breakfast" menu may include "Drink" as shown here:

```
{
    "name":"Drink",
    "subtitle":"",
    "merchant_supplied_id":"Drink",
    "active":true,
    "sort_id":0,
    "items":[
        {
            "name":"Cherry bubly",
            "description":"Unsweetened sparkling water with essence of sweet cherries.",
            "merchant_supplied_id":"ee5eb143-a334-41a6-b186-db2d8841fb57",
            "active":true,
            "price":0,
            "extras":[
            ]
        },
        {
            "name":"Equator Fair Trade Organic Coffee",
            "description":"A dark roast coffee with hints of bittersweet chocolate and walnut.",
            "merchant_supplied_id":"efaad334-e44b-49c3-98ff-e60229f0fa1e"
            "active":true,
            "price":0,
            "extras": [
            ]
        },
        {
            "name":"Green Sheep Sparkling Water",
            "description":"",
            "merchant_supplied_id":"41c0cf24-4acd-495e-9039-e7ca59c78d4d",
                "active":true,
                "price":195,
                "extras":[
                ]
        }
    ]
}
}
```

Figure 6:
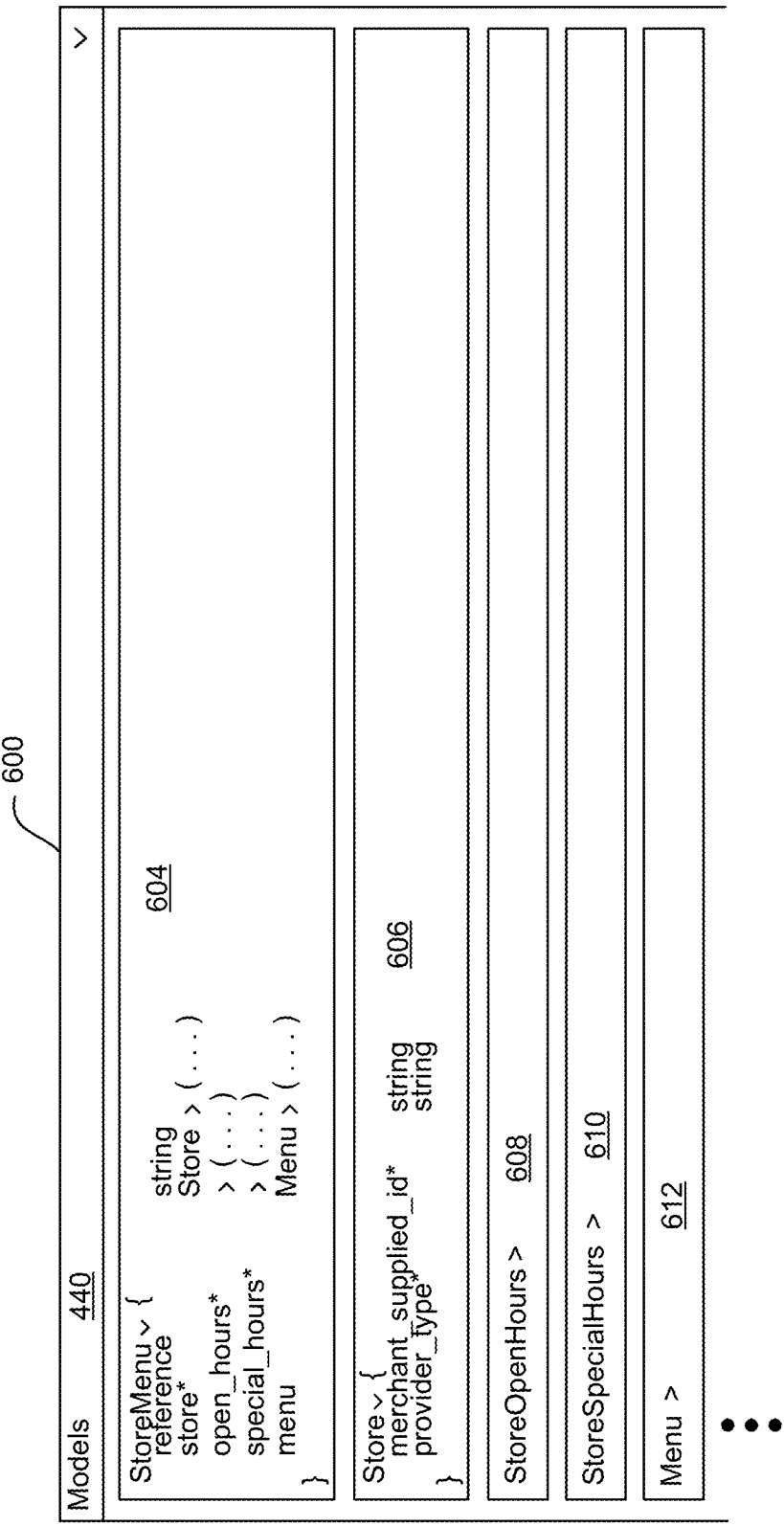
FIG. 6 shows an example of a GUI display of some model API objects, in accordance with examples of the present disclosure.

Additional parameters and models may be provided to users as a glossary. FIG. 6 shows an example of a GUI display 600 of some model API objects, in accordance with examples of the present disclosure. In various embodiments, GUI 600 displays a model glossary when Models 540 is selected, such as at GUI 500-A for example. GUI 600 may list various example models and may indicate appropriate values and value types for the parameters. As illustrated, GUI 600 is displaying StoreMenu model 604, Store model 606, StoreOpenHours model 608, StoreSpecialHours model 610, and Menu model 612. The models and parameters shown should be understood to be exemplary, and various other models and parameters may be included.

Receiving Menu Status Updates

As previously discussed, webhook 416 of the logistics platform may be configured to send status updates, such as when the menu upload has been received, or when the uploaded menu has finished processing. In some embodiments, a user may subscribe to the webhook by preparing a Uniform Resource Locator (URL) to receive status update POST requests (418) from the logistics platform. Such status update POST requests may include payloads with the following example format:

```
{
    "event": {
        "type": "MenuCreate" or "MenuUpdate",
        "status": "SUCCESS" or "FAILURE",
        "reference": either a client-provided or automatically generated reference
            id in UUID
    },
    "store": {
        "merchant_supplied_id": client's store id
    },
    "menu": {
        "id": the menu id on DoorDash's end
    }
}
```

The example status update includes an "event" object with "type," "status," and "reference" parameters. The "type" of event may be MenuCreate for an upload POST request, or MenuUpdate for a menu update PATCH request (described) below. The "status" of event may be success or failure, and the "reference" may include a reference ID, such as reference ID 405, associated with the particular request. The status update POST request may further include "store" objects including the "merchant_supplied_id." A "menu" object may further include a menu ID '{"menu": {"id": <menu id>}}'. Upon creating a menu, the user may receive the menu ID as a universally unique identifier (UUID) in the status update POST request sent out by the webhook. The menu ID may be used to identify the particular menu, and may be required later by the user when transmitting a PATCH request or GET request.

Users may also request status updates by transmitting a GET request to the open API. A user may transmit a GET request using the GUI at the merchant interface by selecting GET functions 512 from GUI 500-A. When GET functions 512 is selected, GUI 500-B may display a section where the user may input user-agent and authorization values. The logistics system may validate the user-agent and authorization values to authenticate the request. If successfully authenticated, the logistics platform will transmit a status of the uploaded menu. For example, a status may indicate that the menu is still being processed, or has been successfully uploaded, or has failed to be processed. The status may indicate the reason for failure, or identify particular errors that need to be addressed. In some embodiments, the status may also include a sample of a successfully uploaded menu as displayed by the logistics platform to customers.

Updating Menus with the PATCH Endpoint

In various embodiments, GUI 500-B may display a similar layout for the parameters for various PATCH functions when PATCH endpoint 516 is selected at GUI 500-A. In some embodiments, a user may enter modified parameters for the menu model into the payload window 502. The user may also include the menu ID associated with the menu. When submitted with the appropriate menu ID, the logistics system can update the corresponding uploaded menu with the updated parameter values. In this way, a user may update items, item stock, store availability, and other parameters in the menu.

The menu update pipeline may work identically to the menu creation pipeline. In some embodiments, only the specific object fields to be updated are included in the payload window 502 along with the update request. However, in some embodiments, the full menu may be included in the payload window. A menu may be removed from display to customers on the logistics platform by setting the "active" field to "false." In some embodiments, the data validation for the PATCH endpoint may be identical to the POST endpoint because it uses the same model. As with the POST request, a "reference" field may be input in the payload or generated by the logistics platform to identify the PATCH request. Once the menu is successfully updated, or if the menu update fails, the webhook will send a status update POST request to the endpoint at the merchant interface.

User Authentication

In some embodiments, the GUI further includes user-agent string 506 and authorization string 508. In section 506, a user may enter an identifier for the upload, including a name and a version. In section 508, a user may input credentials for authentication by the system receiving various HTTP requests. In various embodiments, the token may be provided with the key "Authorization," and the provider type may be included in camel case and version number with key "User-Agent." Such authentication token may be required to be transmitted with API requests in order to authenticate the account corresponding to the user when submitting requests. API requests without authentication or incorrect headers may fail and receive a status code indicating such failure. In some embodiments, each user is provided an authentication token by the logistics platform. For example, a user may be authenticated by including the following header with each request:

```
{
    "Authorization": Bearer <token>,
    "User-Agent": ABCCafe/1.0
}
```

Figure 7:
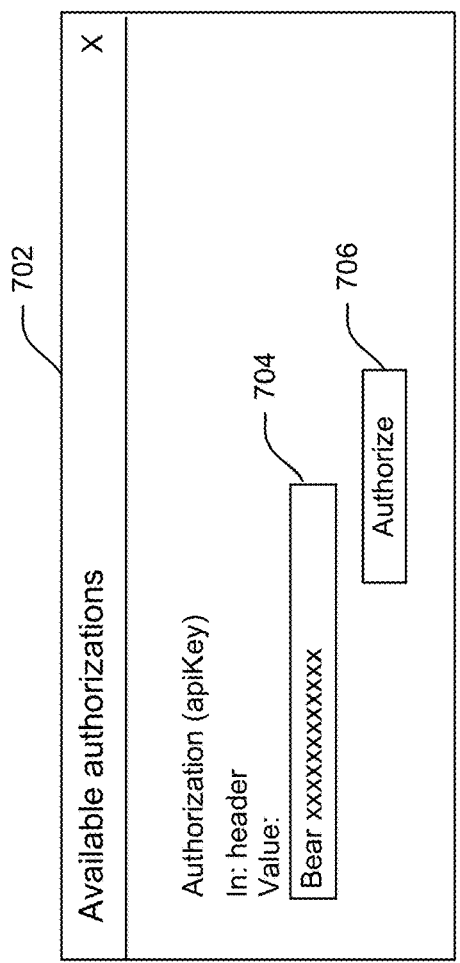
FIG. 7 shows an example GUI display corresponding to an authorization module, in accordance with examples of the present disclosure.

In order to authenticate requests submitted using the endpoints of the open API, the GUI at the merchant interface may display an authorization module. FIG. 7 shows an example GUI display 702 corresponding to an authorization module, in accordance with examples of the present disclosure. Such GUI 702 may be used by users to authenticate the various requests. In various embodiments, GUI 702 may include token window 704 and authorization button 706. A user may input a corresponding token into token window 704 and submit it by selecting button 706. Once authenticated, a user may no longer be required to include their corresponding token in each request.

Additional Integrated API Features

Figure 8:
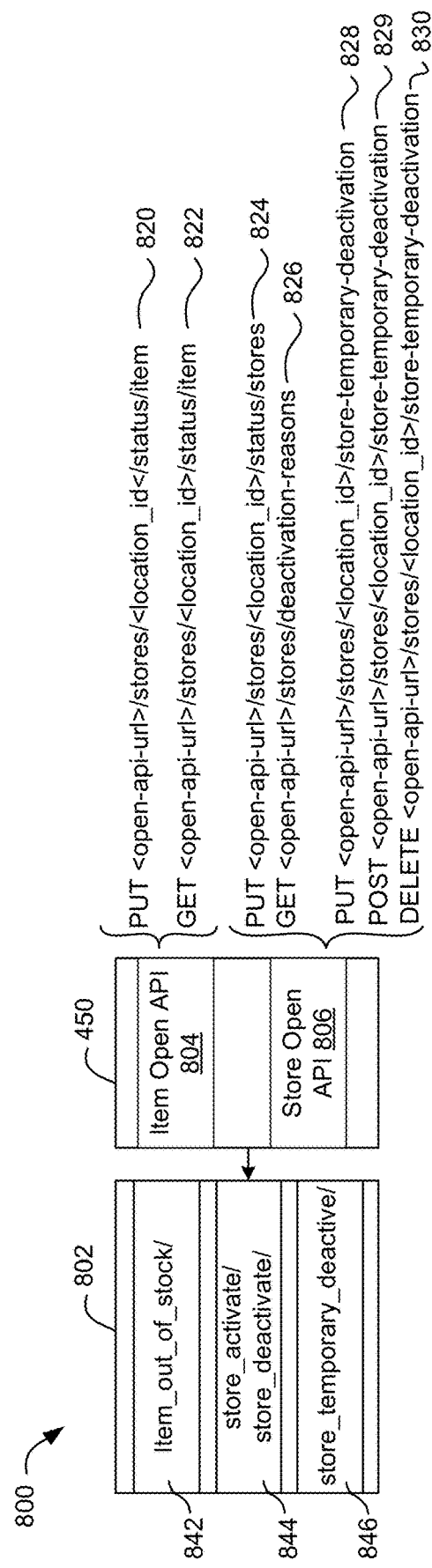
FIG. 8 shows an example architecture for implementing item out of stock and store availability API features, in accordance with examples of the present disclosure.

Additional features may be integrated into the described API. For example, requests may be transmitted between the logistics platform and the merchant POS to automatically determine when particular items are out of stock, or when a particular store in unavailable. FIG. 8 shows an example architecture 800 for implementing item out of stock and store availability API features, in accordance with examples of the present disclosure. In various embodiments, the open API may be configured with an item open API group 804 and store open API group 806. API groups 804 and 806 may include additional endpoints configured on open API 450 to transmit and receive various requests to and from the merchant POS system, and update a system database 802 with the updated information. In certain examples, database 802 may be database 414 which stores menu information. In certain examples, database 802 may be integrated with customer interface engine 420 to update the item status at the front end facing the customers of the logistics platform. In some embodiments, database 802 may implement various programming languages which may support HTTP, such as PYTHON.

The item open API group 804 may include various endpoints to receive or retrieve status updates for item availability, including a GET endpoint and a PUT endpoint. The GET endpoint 822 may be configured to transmit a GET request and PUT endpoint 820 may be configured receive a PUT request. The item open API endpoint may be configured with a uniform resource identifier (URI), such as: open-api-url>/stores/<location_id>/status/item, for example. In some embodiments, the payload body of a PUT request transmitted to the URI may include the following:

```
PUT <open-api-url>/stores/<
location_id</status/item
{
    "data": [{"merchant_supplied_id" : <>, }]
}
```

In various embodiments, the PUT request received at open API 450 updates previously stored parameters of menu items in the system database. The item requests may identify the particular item and corresponding menu. The "is_active status may be "true" for an active or in stock item and "false" for a deactivated or out of stock item. The received information may then be transmitted to endpoint 842 to update information stored at the logistics platform in database 802. The updated stock information may be saved at "item_out_of_stock/". For example:

```
update_item_is_active_status(){
    For item in data:
        PUT <doordash-api>/item_out_of_stock/
        {
            'merchant_supplied_id": <>,
            "is_active": <>
        }
}
```

In some embodiments, a GET request is transmitted from endpoint 822 to the merchant POS system to retrieve updates to menu items, and may include the following payload body:

```
[
    {
        menu_id: menu_id,
        merchant_supplied_id: mx_item_id,
        is_active: true/false
    }
]
```

As previously described, a client of the logistics platform may be referred to as a provider with one or more merchants at different locations. As such, each menu upload may include additional parameters, such as the "location_id" corresponding to the particular merchant of the provider. The store open API group 806 may include PUT endpoint 824 configured to receive status updates for the store availability of one or more merchants of a provider via a PUT request to activate or deactivate a store location. The store open API group 806 may be configured to transmit or receive various requests with a URI such as: open-api-url>/stores/<location_id>/status/stores. In some embodiments, the payload body of the activation or deactivation PUT request to endpoint 824 may include the following:

```
PUT<open-api-url>/stores/<
location_id>/status/store
{
    "Reason": <Integer>,
    "Notes" : ""
}
```

Various deactivation reasons may include: "out_of_business," "pursuing_partnership," "bd_deal_in_progress," "merchant_take_down," "local_operational_issues," "delete_store," "operational_issues," "awaiting_partner_activation," "menu_update," "payment_issue," "cash_only," "cease_and_desist," "order_minimum," "stripe_charges_enabled_false," or "unspecified." In some embodiments, the open API 450 may transmit a check for the reason for a store deactivation. For example, store open API group 806 may include GET endpoint 826 configured to transmit a GET request 826 such as: "GET<open-api-url>/stores/deactivation-reasons" for performing the check for deactivation reasons. The GET request may be transmitted to the merchant POS system.

The received information may then be transmitted to endpoint 844 to update information stored at the logistics platform in system database 802. The updated stock information may be saved at "store_activate/" or "store_deactivate/" in system database 802 depending on the status update in the request. For example:

```
update_store_status(location_id,
provider_type, status, reason:None)
    If status:
        assert reason, "Reason cannot be None"
        http_put(
            url=<doordash-api-
            url>/provider_type/<>/location_id/<
            location_id>/store_deactivate,
            body=reason
        ) else
            http_put(
                url=<doordash-api-
                url>/provider_type/<>/location_id/<
                location_id>/store_activate
```

In various embodiments, open API 450 may be configured to automatically identify item or location status. For example, an order confirmation 428 may include a status indicator stating that an order cannot be fulfilled because of an out of stock item along with the merchant supplied_id for the item. As another example, an endpoint of menu open API group 408 may receive a PATCH request including updates to the "active" status of a particular menu or particular "open_hours" corresponding to the menu.

The store open API group 806 may further be configured to receive requests for managing temporary store deactivations via endpoints 828, 829, and 830. An example URI for this API group 806 may be: open-api-url>/stores/<location_id>/store-temporary-deactivation. In some embodiments, a POST request indicating a temporary store deactivation may be received at POST endpoint 829. The payload body of the temporary deactivation POST request 829 may include the following:

```
POST <open-api-url>/stores/<location_id>/
store-temporary-deactivation
{
   "reference": "12345-test-id",
   "store":{
      "merchant_supplied_id":"abc12345",
      "provider_type":"abc_cafe"
{
      "temporarydeactivation":{
         "is_active": <>
         {
            "end_time": <>,
            "Notes" : <>
         }
```

A store open API group 806 may further include PUT endpoint 828 configured to receive a PUT request to update a previously scheduled deactivation, such as:

```
PUT <open-api-url>/stores/<location_id>/
store-temporary-deactivation
   {
      "end_time": <>,
      "Notes" : <>
   }
```

Such PUT request may modify the end_time of the temporary deactivation.

Additionally, store open API group 806 may further include DELETE endpoint 830 configured to receive a DELETE request to stop the temporary deactivation, such as: DELETE <open-api-url>/stores/<location_id>/store-temporary-deactivation. In some embodiments, the DELETE request may not deactivate the TemporaryDeactivation object, but instead sets the "end time" object to utcnow( ). The system database 802 may then receive the temporary deactivation status at endpoint 846 to update the temporary deactivation status at "store_temporary_deactivate/" such as: "send_temporary_deactivation_request(location_id, provider_type, end_time, notes)."

These additional integrated API features allow greater flexibility, and more configurability, in managing menu items and operating hours on the logistics platform, especially for providers with numerous merchant (store) locations, such as large chain restaurants. As such, a provider, or particular merchant of a provider, may easily transmit modifications to menus and operating hours of particular locations in the universal format.

Alternative Graphical User Interfaces

In some embodiments, alternate GUIs are presented to the user at the merchant interface to further simplify the menu upload for users who may not be familiar with entering data in a JSON format. In some embodiments, displays 900 and 910 may be provided in place of the payload window, such as payload window 502. As such, a user may input menu items in a format that is more straightforward. In some embodiments, displays 900 and 910 function as a front end interface to show the user how each menu item will display to the customer as the user creates or modifies the menu upload.

FIG. 9A shows an example GUI display 900 for a menu item, in accordance with examples of the present disclosure. GUI 900 shows a layout of a menu with input for menu name 902 and menu subtitle 904. This may correspond to menu name and subtitle JSON objects as described with reference to FIG. 5B. Additionally, input for item name 906 and item subtitle 908 may correspond to item name and subtitle JSON objects as described with reference to FIG. 5B. A user may simply create a new item by entering the text in a provided text box. Similarly, input for extras 910 may correspond to extras JSON objects as previously described. A user may then input a number of options, such as green salsa, hot salsa, mild salsa, no salsa, and roasted salsa. As such, a user may avoid having to enter min_num_options and/or max_num_options parameters. A user may also designate whether the extra selection is required or optional, thereby setting min_option_choice_quantity parameters. Thus, a user may enter each parameter without using the JSON format.

FIG. 9B an example GUI display 920 for another menu item, in accordance with examples of the present disclosure. GUI 920 shows item name 922 ("10 Wings") and subtitle 923 ("10 Boneless Wings"). A first extra 924 may indicate "special cooking instructions," with an option 925 for "extra well done." A second extra 926 may indicate "wing flavors," with options 928, 930, and 932. The user may also format how they want extras and options to be presented to the customer. For example options for extra 924 are shown as check boxes for selection, while options 928, 930, and 932 for extra 926 are displayed as boxes to input a particular quantity.

Receiving Orders Via The API

The logistics platform may further include a notification engine to notify users of incoming live new orders. With reference back to FIG. 4B, webhook 422 transmits an order notification POST request 424 to the merchant interface 402. Such notification may include the same authentication header as described with reference to the status update POST requests. In some embodiment, the order notification POST request may be transmitted to the same endpoint as the reference ID 405 and/or the status update POST request at the merchant POS system. However, request 424 may be transmitted to a different endpoint configured for the request. Such order notification POST requests may include payloads with the following format:

```
{
   "event": {
      "type": "OrderCreate",
      "status": NEW
   },
   "order": <Order json object>
}
```

The "order" object may comprise a JSON object. An example order object is provided as follows:

```
{
  "categories": [
    {
      "items": [
        {
          "extras": [
            {
              "merchant_supplied_id":
                "INDIVIDUAL_SAUCES",
              "name": "Signature Sauces",
              "options": [
                {
                  "extra": [
                    {
                      "merchant_supplied_id":
                        "BREAKFAST_CONDIMENTS",
                      "name": "Breakfast Condiments",
                      "options": [
                        {
                          "merchant_supplied_id":
                            "ADD_SALT",
                          "name": "Salt",
                          "price": 0,
                          "quantity": 1
                        }
                      ]
                    }
                  ],
                  "merchant_supplied_id":
                    "ADD_KETCHUP_INDIVIDUAL",
                  "name": "KETCHUP",
                  "price": 0,
                  "quantity": 1
                }
              ]
            }
          ],
          "merchant_supplied_id":
            "26d3fce0-efd2-46d3-832c-ced5bc956401",
          "name": "Burrito Scram-Bowl",
          "price": 0,
          "quantity": 1
        }
      ],
      "merchant_supplied_id": "Entree",
      "name": "Entree"
    }
  ],
  "consumer": {
    "email": "shelling@doordash.com",
    "first_name": "Shelling",
    "id": 0,
    "last_name": "Hsu",
    "phone": "000-000-0000"
  },
  "id": "abc12345",
  "order_special_instructions": "",
  "store": {
    "merchant_supplied_id": "abc12345",
    "provider_type": "abc_cafe"
  },
  "subtotal": 2000,
  "tax": 300
}
```

The order object may include an order ID (shown as "id" field above), which identifies the particular order. With reference back to FIG. 4B, the merchant POS system may transmit order confirmation 428 to an endpoint of order open API group 426. The order confirmation may be transmitted as a PATCH request or a PUT request. The order confirmation may include the order ID. An example payload of the order confirmation may include the following format:

```
{
  "merchant_supplied_id": your store id,
  "order_status": SUCCESS or FAIL,
  "prep_time": a datetime object with the time
    you expect the order to be prepared by,
  "failure_reason": string detailing
    reason for failure
}
```

The order confirmation payload may include "merchant supplied_id," "order_status," "prep_time," and "failure-reason" objects. The "merchant_supplied_id" for the order confirmation may be an identifier for the order on the merchant side, such as "Order #99." If the merchant is able to fulfill the order, the response may include SUCCESS as the "order_status." Otherwise, a response with FAILURE is included along with a string under "failure_reason" detailing why the order is unable to be fulfilled. This message may be used by the logistics platform to track failures and troubleshoot potential system issues. The "prep_time" object may include a date/time object with the estimated time the order will be prepared by.

Figure 10:
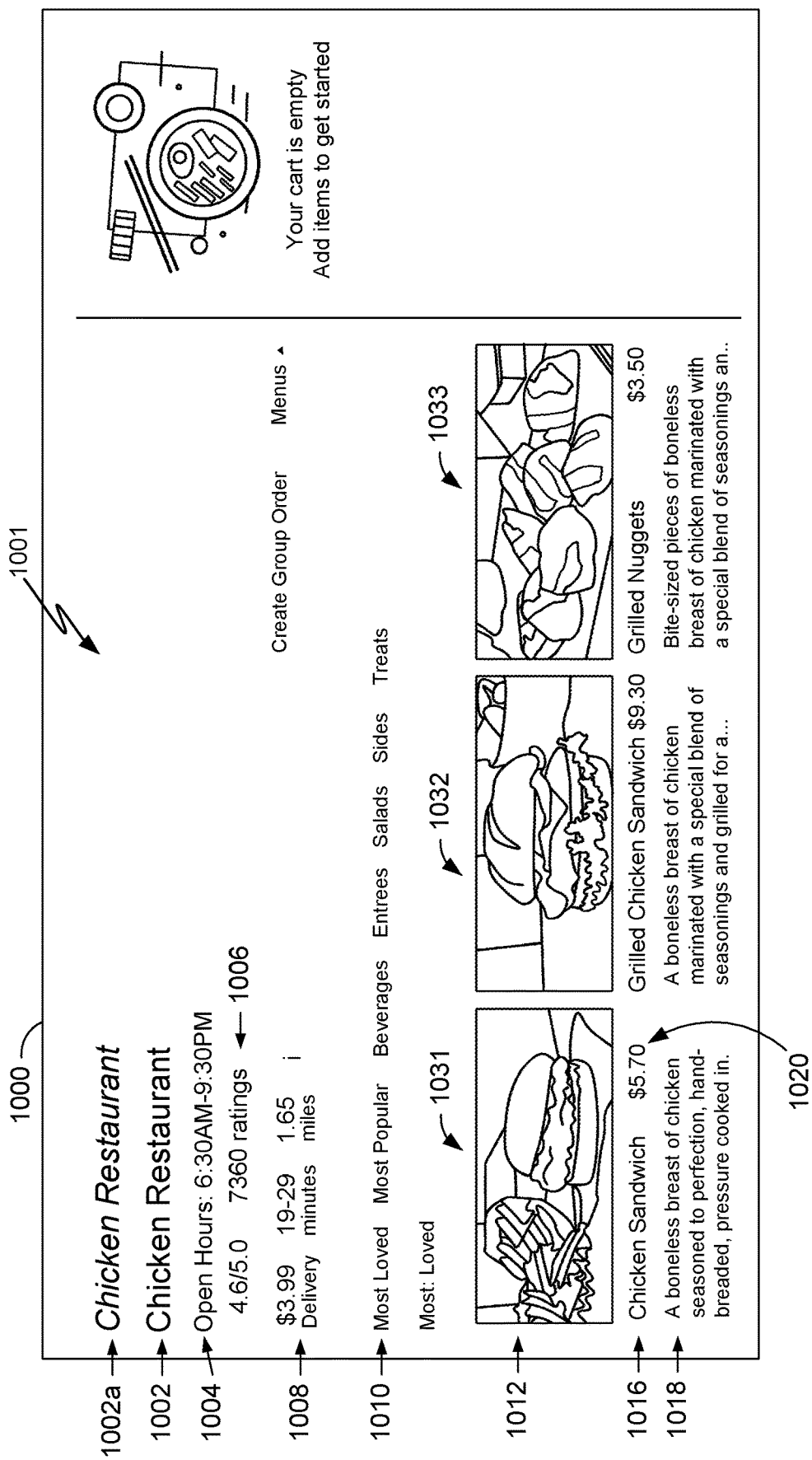
FIG. 10 shows an example GUI display showing multiple menus, in accordance with examples of the present disclosure.

FIG. 10 shows an example GUI display 1000 showing multiple menus, in accordance with examples of the present disclosure. As previously described, successfully uploaded menus may be accessible by customers on the logistics platform. The parameters and objects of the menu may be formatted for presentation to the user via a customer interface which may be displayed on a user device. For example, a customer may access menus on the logistics platform via a web browser or other application on a personal computer or smart phone. As such a customer may view a menu 1001 as displayed on GUI 1000.

In various embodiments, menu 1001 may show various data corresponding to objects and parameters input by the user, as previously discussed. As illustrated, menu 1001 may include merchant name 1002, which may correspond to parameters for the "provider_type" object. In some embodiments, menu 1001 may also display a stylized logo 1002a of the merchant. Open hours 1004 may also be displayed, which correspond to the parameters for the "open_hours" objects. Categories 1010 may correspond to the "categories" objects for the menu. For example, categories 1010 may include "Most Loved," "Most Popular," "Beverages," "Entrees," "Salads," and "Treats."

As illustrated, the "Most Loved" category is currently selected displaying items 1031, 1032, and 1033. In various embodiments, each item may include an item name corresponding to the "name" parameter for the corresponding "item" object as well as an item description corresponding to the "description" parameters for the corresponding "item" object. Each item may also include a price 1020 corresponding to the "price" parameters for the corresponding "item" object. In some embodiments, the menu may also display an image 1012 of the particular item. Such image may be provided by the merchant to be stored at the logistics platform for retrieval when the menu is accessed by a customer.

In some embodiments, other information may be displayed to the customer. For example, the menu may display customer rating 1006 of the restaurant. The ratings may be determined from aggregated data received by customers via corresponding user devices. In some embodiments, merchant logistics 1008 may also be shown to provide various information to the customer regarding deliveries from the merchant. For example, as shown, merchant logistics 1008 shows the customer a delivery fee of $3.99, a delivery and/or preparation time of 19-29 minutes, and a distance of 1.65 miles away from a user device or address corresponding to the customer.

Figure 11:
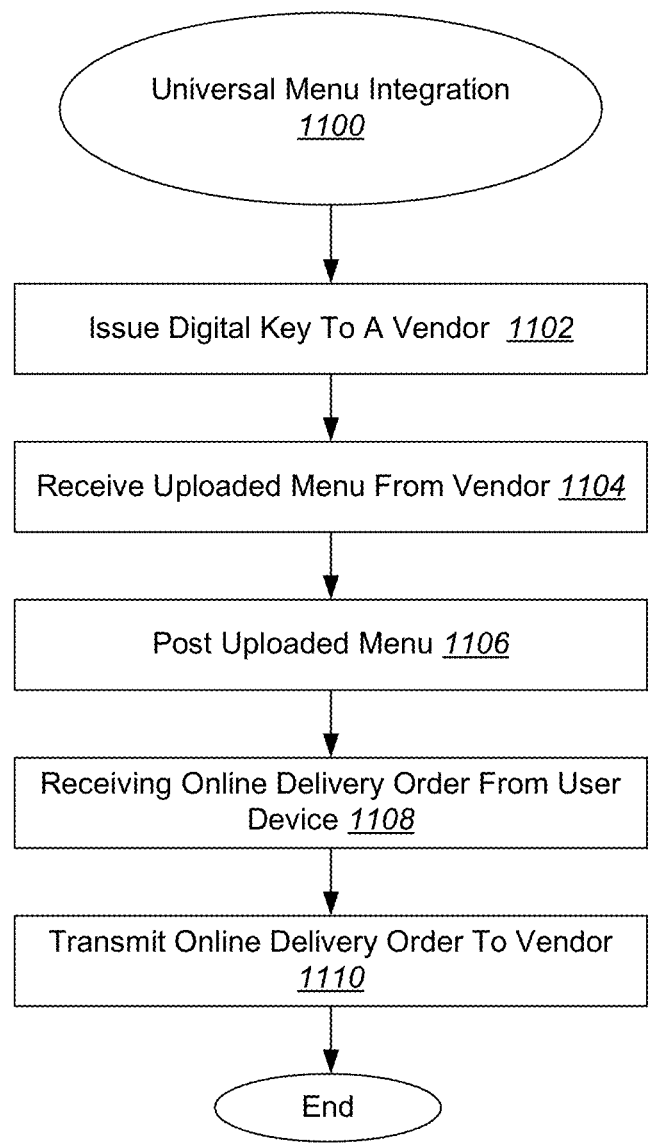
FIG. 11 shows a flowchart of a method for universal menu integration, in accordance with examples of the present disclosure.

FIG. 11 shows a flowchart of a method 1100 for universal menu integration, in accordance with examples of the present disclosure. Method 1100 can be executed by a processor and memory. At operation 1102 a digital key is issued to a vendor to access an interface. In some embodiments, the interface is an application programming interface (API) utilizing an API library including post, get, and patch functions. A user associated with the merchant or vendor may be provided with the digital key to authenticate requests transmitted to the logistics platform. For example, a vendor may be provided with an authentication token as previously discussed with reference to FIGS. 5B and 7.

At operation 1104, an uploaded menu from the vendor is received. In some embodiments, the uploaded menu is in a universal format based on pre-determined criteria, such as the JSON data objects previously described. The user may input JSON data objects and parameters into a payload window using a GUI, such as GUI 500-B. In some examples, receiving the uploaded menu includes receiving a full menu from the vendor via a HyperText Transfer Protocol (HTTP) request, such as a POST request. For example, the logistics platform may receive a POST request including a menu upload from an endpoint at the merchant user interface. The POST request may be received at an endpoint configured at the menu open API group 408 of the logistics platform.

In some embodiments, each menu item in the uploaded menu includes two different identifiers, a system identifier and a vendor identifier. The system identifier may be the "name" and/or "description" parameters of the "items" objects. The vendor identifier may be the "merchant supplied_id" corresponding to each "items" object.

In some embodiments, the uploaded menu corresponds to a unique reference identifier that is transmitted to the vendor after the uploaded menu is received. The reference identifier may refer to the "reference" object, such as reference ID 405. Such reference ID 405 may be used by the user and the logistics platform to track the status of a submitted HTTP request. However, the reference identifier may alternatively refer to the menu ID which is generated by the logistics platform and provided to the user to identify the particular menu. The menu ID may be used by the user or logistics platform to when providing changes or updates the particular menu.

In some embodiments, the uploaded menu is submitted in a format different from the universal format and then subsequently translated into the universal format. In some embodiments, a merchant user may upload a menu in an original format. Such format may be a PDF or other text document. In some embodiments, a user may submit a uniform resource locator (URL) or other link designating a location of a menu. The logistics platform may use the link to obtain a copy of the menu. In some embodiments, the uploaded menu is first uploaded into a task queue, such as task queue 410, before being translated into the universal format.

In some embodiments, the menu may be manually translated into the universal format at the logistics platform. However, in other embodiments, the menu may be automatically translated into the universal format. For example, a data processor such as menu processor 412 may parse and identify items and text in an uploaded menu and convert the items into the universal format. For example, optical character recognition (OCR) methods may be implemented to read and organize text on an uploaded menu. In some embodiments, the data processor may implement a neural network or other machine learning algorithms to perform OCR techniques. In some embodiments, the uploaded menu is translated into the universal format using a depth first search algorithm. In some embodiments, the uploaded menu is read using the depth-first search algorithm to be integrated into the logistics platform.

Then, at operation 1106, the uploaded menu is posted for receiving online delivery orders. For example, menu may be available for customers to access on the logistics platform via a web browser or other application on a user device, such as a personal computer or smartphone. In some embodiments, the system is configured to receive menu updates after posting the uploaded menu. For example, a user may provide updates to the particular menu by submitting a POST request via a PATCH endpoint at the merchant interface, such as PATCH endpoint 516.

Customers may select one or more various items included in the menu parameters for real-time ordering and delivery coordinated by the logistics platform. Once a customer selects the desired items, an online delivery order is received from a user device at operation 1108. The logistics platform may receive the online delivery order and transmit the online delivery order to the vendor at operation 1110. The online delivery order may be transmitted to the merchant POS system as an order notification POST request, such as POST request 424. The order notification POST request may be received at an endpoint at the merchant POS. The order notification POST request may include a JSON object body which includes the ordered items and selected options, as well as an order ID to identify the order.

An order confirmation, such as order confirmation 428, may then be transmitted as a PATCH request to the open API at the logistics platform. The order confirmation may include whether the order can be fulfilled and any reasons for a failure to fulfill the order. The order confirmation may further include other information regarding the order, such a preparation time.

Shared Objects

With pre-defined hierarchy of menu structures, merchant users can easily construct menus and send to the logistics platform and also expect the orders to be sent back to merchants as a slice of menus, sometimes including customized data transformation as merchants desire. In some embodiments, the system may implement shared objects between menu items to further simplify the menu upload for the user at the merchant side. Because a single menu may include many objects coding the items offered by the merchant, the uploaded menus may vary in size from a few kilobytes to tens of megabytes.

In some embodiments, there are many objects reusable in the JSON body of a menu. For example, a product ("item" object in the JSON) could appear in different categories. As another example, a set of condiments ("extras" objects in the JSON) could be shared between many products. A shared syntax may provide a way to mark objects as shared in the JSON. Client side software is also provided in order to eliminate the development overhead for providers managing massive amount of menus on the logistics platform. This would prevent or minimize duplication of objects in the JSON body, reduce traffic in the system servers, and also help users create and edit the menus with less effort.

In some embodiments, a data processor at the logistics platform, such as menu processor 412, may be configured to identify a certain block of data that is shareable through the syntax. This block of data may be stored into a register, such as database 414. A reference string may be associated with the data block and included in the JSON body of the menu to reference the attributes belonging to this block. In some embodiments, it is inline extended, appended into a set of other attributes, and used to construct new data set by the data processor.

In some embodiments, an object may be marked as a shareable data block based on reserved words. Whenever the data processor reaches a reserved word upon scanning data, it may apply the predefined actions corresponding to each reserved word to put the current block of data into a register, refer to data in a register, and build new data set with the data in a register. In some embodiments, the syntax may be implemented as JSON Reference and Pointer. In some embodiments, the syntax may be implemented as Twisted YAML Ain't Markup Language (YAML) Anchors and Aliases in JSON.

With respect to the syntax of JSON Reference and Pointer, JSON Reference is a structure which allows a JSON value to reference another value in a JSON document. This provides the basis for transclusion in JSON, which is the use of a target resource as an effective substitute for the reference. In some embodiments, a JSON Reference is a JSON object, which contains a member named "$ref", which has a JSON string value, such as {"$ref": "http://example.com/example.json#/foo/bar"}

If a JSON value does not have these characteristics, then it should not be interpreted as a JSON Reference. The "$ref" string value contains a uniform resource identifier (URI), which identifies the location of the JSON value being referenced. It is an error condition if the string value does not conform to URI syntax rules. Any members other than "$ref" in a JSON Reference object may be ignored. Before resolving a reference, an example JSON reference and pointer may appear as:

{"real": [1, 2, 3, 4], "ref": {"$ref": "#/real"}}

One resolved, the reference and pointer may appear as:

{'real': [1, 2, 3, 4], 'ref': [1, 2, 3, 4]}

As such, the entire reference {"$ref": "#/real" } is replace by the data it refers to.

YAML anchors and aliases may alternatively be implemented to defined shared objects. A YAML node represents a single native data structure. Such nodes have content of one of three kinds: scalar, sequence, or mapping. In addition, each node has a tag which serves to restrict the set of possible values the content can have. In various embodiments, a node may appear in more than one collection. When serializing such data, the first occurrence of the node is identified by an anchor. Each subsequent occurrence is serialized as an alias node which refers back to this anchor. Otherwise, anchor names are a serialization detail and are discarded once composing is completed. When composing a representation graph from serialized events, an alias node may refer to the most recent node in the serialization having the specified anchor. Therefore, anchors need not be unique within a serialization. In addition, an anchor need not have an alias node referring to it. It is therefore possible to provide an anchor for all nodes in serialization.

An anchor may be denoted by the "&" indicator, and marks a node for future reference. An alias node can then be used to indicate additional inclusions of the anchored node. An anchored node need not be referenced by any alias nodes; in particular, it is valid for all nodes to be anchored. For example, the YAML data with anchor and alias below:

First occurrence: &anchor
  K1: "One"
  K2: "Two"
Second occurrence: *anchor
Once we resolve the anchor and alias, the data will become
First occurrence:
  K1: "One"
  K2: "Two"
Second occurrence:
  K1: "One"
  K2: "Two"

For example, a* star symbol and the name of anchor may be used to make an inline replacement to indicate the data block to be reused. The data that the alias refers to can be also combined with other data to construct a new data set. For example, with the <<: operator, a YAML processor will concatenate new data with data defined before. For example:

Third occurrence:
  <<: *anchor
  G1: "Eins"
  G2: "Zwei"
After resolving, it will become:
Third occurrence:
  K1: "One"
  K2: "Two"
  G1: "Eins"
  G2: "Zwei"

This provides richer ways to organize reusable data sets without the need to redefine data if they match each other partially.

In some embodiments, the syntax of YAML Anchor and Aliases can be adjusted such that a JSON format can be adopted. An example of twisted YAML anchors and aliases in JSON is provided below:

```
"First occurrence": {
    "&": "anchor",
    "K1": "One",
    "K2": "Two"
}
```

The "&" symbol indicates that this data block should be put into a register by the data processor and "anchor" is the given name.

A reference the data block at a second occurrence may appear as follows:

```
"Second occurrence": {
    "*": "anchor"
}
```

The "*" symbol may indicate that this data block has been defined before. After resolving, it will become:

```
"First occurrence": {
    "K1": "One",
    "K2": "Two"
}
"Second occurrence": {
    "K1": "One",
    "K2": "Two"
}
```

Similar to the examples above, the data that the alias refers to can also be combined with other data to construct a new data set. For example:

```
"Third occurrence": {
    "<<": "anchor",
    "G1": "Eins",
    "G2": "Zwei",
}
```

After resolving, it will become:

```
"Third occurrence": {
    "K1": "One",
    "K2": "Two",
    "G1": "Eins",
    "G2": "Zwei",
}
```

As such, users may use YAML anchors and aliases to mark particular data blocks as referenceable. This may allow a data processor to write to the register just in time instead of scan one more time before actual processing in the scenario of multiple threads. When twisting the syntax into JSON, YAML format may provide richer ways to organize reusable data, like extending data which JSON references and pointers are not capable of doing.

FIG. 12 is a block diagram illustrating an example of a system 1200 capable of implementing various processes described in the present disclosure. According to particular examples, a system 1200, suitable for implementing particular examples of the present disclosure, includes a processor 1201, a memory 1203, an interface 1211, and a bus 1215 (e.g., a Peripheral Component Interconnect (PCI) bus or other interconnection fabric) and operates as a streaming server. In some examples, when acting under the control of appropriate software or firmware, the processor 1201 is responsible for the various steps described in any methods and systems described herein. Various specially configured devices can also be used in place of a processor 1201 or in addition to processor 1201.

The interface 1211 is typically configured to send and receive data packets or data segments over a network. Particular examples of interfaces supports include Ethernet interfaces, frame relay interfaces, cable interfaces, Digital Subscriber Line (DSL) interfaces, token ring interfaces, and the like. In addition, various very high-speed interfaces may be provided such as fast Ethernet interfaces, Gigabit Ethernet interfaces, Asynchronous Transfer Mode (ATM) interfaces, High Speed Serial (HSS) interfaces, Point of Sale (POS) interfaces, Fiber Distributed Data (FDD) interfaces and the like. Generally, these interfaces may include ports appropriate for communication with the appropriate media. In some cases, they may also include an independent processor and, in some instances, volatile Random Access Memory (RAM). The independent processors may control such communications intensive tasks as packet switching, media control and management.

According to particular example examples, the system 1200 uses memory 1203 to store data and program instructions for operations. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific examples thereof, it will be understood by those skilled in the art that changes in the form and details of the disclosed examples may be made without departing from the spirit or scope of the disclosure. It is therefore intended that the disclosure be interpreted to include all variations and equivalents that fall within the true spirit and scope of the present disclosure.

What is claimed is:

1. A system comprising:
one or more processors; and
memory, the memory storing instructions that, when executed by the processors, cause the processors to:
process a menu associated with a vendor, the menu being in a first format, the menu including a reference to a data block, the reference to the data block indicating a location within the menu at which the reference is to be replaced by the data block;
post a visual representation of the menu via a network;
process an online delivery order received from a computing device, the online delivery order pertaining to the vendor; and
transmit information pertaining to the online delivery order to the vendor via an interface of a vendor system.

2. The system of claim 1, the memory further storing instructions that, when executed by the processors, cause the processors to:
receive the menu from the vendor via a HyperText Transfer Protocol (HTTP) request.

3. The system of claim 1, wherein each menu item in the menu includes a system identifier and a vendor identifier.

4. The system of claim 1, wherein the menu corresponds to a unique reference identifier.

5. The system of claim 1, the memory further storing instructions, that when executed by the processors, cause the processors to:
insert the menu into a task queue before processing the menu.

6. The system of claim 1, wherein the interface includes an application programming interface (API).

7. The system of claim 1, the memory further storing instructions that, when executed by the processors, cause the processors to:
translate the menu from a second format to the first format.

8. A method, comprising:
- processing a menu associated with a vendor, the menu being in a first format, the menu including a reference to a data block, the reference to the data block indicating a location within the menu at which the reference is to be replaced by the data block;
- posting a visual representation of the menu via a network;
- processing an online delivery order received from a computing device, the online delivery order pertaining to the vendor; and
- transmitting information pertaining to the online delivery order to the vendor via an interface of a vendor system.

9. The method of claim 8, further comprising:
- receiving the menu from the vendor via a HyperText Transfer Protocol (HTTP) request.

10. The method of claim 8, wherein each menu item in the menu includes a system identifier and a vendor identifier.

11. The method of claim 8, wherein the menu corresponds to a unique reference identifier.

12. The method of claim 8, further comprising:
- inserting the menu into a task queue before processing the menu.

13. The method of claim 8, wherein the interface includes an application programming interface (API).

14. The method of claim 8, further comprising:
- translating the menu from a second format to the first format.

15. A non-transitory computer readable medium storing instructions to execute a method, the method comprising:
- processing a menu associated with a vendor, the menu being in a first format, the menu including a reference to a data block, the reference to the data block indicating a location within the menu at which the reference is to be replaced by the data block;
- posting a visual representation of the menu via a network;
- processing an online delivery order received from a computing device, the online delivery order pertaining to the vendor; and
- transmitting information pertaining to the online delivery order to the vendor via an interface of a vendor system.

16. The non-transitory computer readable medium of claim 15, the method further comprising:
- receiving the menu from the vendor via a HyperText Transfer Protocol (HTTP) request.

17. The non-transitory computer readable medium of claim 15, wherein each menu item in the menu includes a system identifier and a vendor identifier.

18. The non-transitory computer readable medium of claim 15, wherein the menu corresponds to a unique reference identifier.

19. The non-transitory computer readable medium of claim 15, the method further comprising:
- inserting the menu into a task queue before processing the menu.

20. The non-transitory computer readable medium of claim 15, wherein the interface includes an application programming interface (API).

* * * * *